United States Patent [19]

Linderoth

[11] 4,455,046

[45] Jun. 19, 1984

[54] SAFETY DEVICE FOR THE VEHICULAR TRANSPORT OF A PERSON TRAVELLING IN A WHEELCHAIR

[76] Inventor: Hans Linderoth, 4 Rue Mignard, Paris 16, France

[21] Appl. No.: 253,974

[22] Filed: Apr. 13, 1981

[30] Foreign Application Priority Data

Apr. 15, 1980 [FR] France .............................. 80 08449

[51] Int. Cl.³ .............................................. B60N 1/02

[52] U.S. Cl. .............................. 296/65 R; 248/503.1; 280/289 WC; 297/DIG. 4; 403/374; 410/51; 410/3

[58] Field of Search ........................ 410/3, 4, 23, 7, 30, 410/96, 101, 51, 97, 99, 100, 103; 280/289 WC, 807, 801; 296/64, 19, 20, 65 R, 65 A; 248/500, 503, 503.1; 297/DIG. 4; 403/257, 261, 373, 374, 377, 343, 7; 188/2 F

[56] References Cited

U.S. PATENT DOCUMENTS

| | | | |
|---|---|---|---|
| 3,298,324 | 1/1967 | Schwiebert | 410/103 |
| 3,377,044 | 4/1968 | Jackson et al. | 410/96 |
| 3,752,265 | 8/1973 | Lyder | 188/2 F |
| 4,019,752 | 4/1977 | Leon et al. | 410/4 |
| 4,093,303 | 6/1978 | Nelson | 410/51 |
| 4,133,556 | 1/1979 | Glinski | 280/801 |
| 4,257,644 | 3/1981 | Stephens | 410/96 |
| 4,265,478 | 5/1981 | Korsgaard | 410/23 |

FOREIGN PATENT DOCUMENTS

| | | | |
|---|---|---|---|
| 135564 | 5/1979 | Fed. Rep. of Germany | 410/23 |
| 2,827,377 | 1/1980 | Fed. Rep. of Germany | 410/7 |
| 2826204 | 3/1980 | Fed. Rep. of Germany | 410/23 |
| 2845870 | 5/1980 | Fed. Rep. of Germany | 297/DIG. 4 |
| 2383342 | 6/1978 | France | 410/3 |
| 573621 | 9/1977 | U.S.S.R. | 403/374 |

*Primary Examiner*—Randolph Reese
*Assistant Examiner*—Donald Hajec
*Attorney, Agent, or Firm*—Beveridge, DeGrandi and Kline

[57] ABSTRACT

The safety device consists of a safety belt (33, 34, 35) anchored to the wheelchair (1) to hold the occupant in this wheelchair and a mechanism (12) for securing the wheelchair to the floor (13) of the transport vehicle.

Application: to transporting people travelling in wheelchairs by land vehicles, boats or aircraft.

3 Claims, 5 Drawing Figures

SAFETY DEVICE FOR THE VEHICULAR TRANSPORT OF A PERSON TRAVELLING IN A WHEELCHAIR

The instant invention involves a safety device for the vehicular transport of a person travelling in a wheelchair.

The transportation of persons travelling in wheelchairs by coach or other land vehicles, by ship or by aircraft has always set problems. These vehicles are in fact continuously subjected to a range of forces (acceleration, deceleration, centrifugal forces, roll, pitch, various jolts, etc.) not to mention impacts in the event of accident. Simply locking the wheelchair wheels by brakes does not provide the occupant of the wheelchair with adequate protection. Similarly, the possible presence of a personal guard accompanying the occupant of a wheelchair has virtually no effect in this connection.

This is why people travelling in wheelchairs cannot move about as easily as they would like. This problem has been gradually getting more widely recognized, but so far no effective solution allowing these disadvantaged people to benefit from freedom of movement, and so from independence, has been developed. So far the transport of people travelling in wheelchairs has meant vehicles being especially fitted out and often, also, considerable alterations being made to the wheelchairs themselves in order to enable them to be fixed inside the vehicles. Nonetheless, this securing of the wheelchairs does not provide the occupants of these wheelchairs with effective protection and cannot be performed without an assistant being present.

The object of this invention is a simple safety device, only involving slight modifications to a conventional transport vehicle and to conventional wheelchairs, which nevertheless provides the occupants of wheelchairs, without assistance from a guard or other person, with effective protection against the forces which occur during the normal operation of the vehicles as well as against the effects of impacts occurring in the event of an accident.

The safety device according to the invention for the transport, in a vehicle, of a person travelling in a wheelchair comprises a safety belt or seat belt fixed to the wheelchair to hold the person in this wheelchair and a mechanism for securing the wheelchair to the transport vehicle.

The combination of these two means guarantees both that the wheelchair is fixed with respect to the transport vehicle and the person occupying the wheelchair is fixed with respect to this wheelchair. This combination of two holding functions means that the seat occupant does not suffer from the inertia effects of the weight of the wheelchair. The wheelchair occupant can fasten himself, on his own, to the wheelchair using the seat belt and secure the wheelchair to the vehicle with the securing mechanism, and can also release himself, if necessary, on his own following an accident.

The securing mechanism consists of at least one hold-down component built into the vehicle and two attachment components fitted on the wheelchair and operated by the chair occupant so as to engage with the said hold-down component.

So that the forces to which the seat belt fitting the wheelchair is subjected in the case of any accident on the transport vehicle are transmitted to the vehicle directly and not via the wheelchair, it is advantageous for the seat belt to be fixed to the attachment components or to the elements supporting these components on the wheelchair frame. This also prevents the wheelchair occupant from bearing the latter's weight in the case of impact.

According to one embodiment, the said hold-down component may advantageously consist of a long section fastened to the vehicle floor crosswise to the normal direction of travel of the vehicle so that one of the longitudinal edges of the said section is open and is accessible both from underneath and in a direction lying along the direction of normal travel of the vehicle. The said attachment component then advantageously comprises a gripping tab fitted on the wheelchair in such a way as be capable of being engaged underneath the said open edge of the section fixed to the floor and of being raised so as to be hooked under the said edge of the section and locked in this position with respect to the wheelchair.

The cross section not only provides perfect holding down; it also enables grip tabs to be attached which have different spacings due to the fitting of the two attachment components on wheelchairs of different widths.

The said grip tab is preferably located at the bottom end of a rod mounted to slide in a tube fixed in a roughly vertical position to the wheelchair, between the latter's front and rear wheels, with the said rod carrying at its top end a means capable of being operated simply by the wheelchair occupant so as to raise the said rod with respect to the said tube and to lock it in the raised position with respect to the said tube.

The said operating means preferably comprises an eccentric hinged by a roughly horizontal pin to the top end of the said rod so that its circumferential surface, acting as a cam, engages with the top end of the tube, along with an operating lever fixed to the said excentric so as to permit this latter to rotate, in order to raise the rod with respect to the tube and to lock the rod in the raised position with the grip tab hooked under the open edge of the hold-down section.

The hold-down section can advantageously be recessed into the transport vehicle floor so that its open edge is at roughly floor height.

In order to provide good fixing of the wheelchair in both directions of normal vehicle travel, i.e. both backwards and forwards, it is advantageous for the open edge of the hold-down section to have a downward turned flange and for the said grip tab of each attachment component to have an upward turned flange.

Preferably, each attachment component also comprises a means for fixing the sliding rod with respect to the tube in a high enough position for the grip tab disengaged from the hold-down section to be above the vehicle floor and not hinder normal travel of the wheelchair.

Preferably, the safety belt is of the three-point inertia reel type. One of the columns of the wheelchair back can be extended above the height of the occupant's shoulders and carry a return pulley at its top end for the belt strap, one end of which is fixed to one of the attachment components and the other end of which starts at the reel fixed behind the chair, with the belt buckle being fixed to the other attachment component.

According to another embodiment of the invention, the mechanism for securing the wheelchair to the transport vehicle comprises two hold-down components connected to the vehicle at a distance apart which is adjustable to the width of the wheelchair and two attachment components of adjustable length mounted on the wheelchair in such a manner as to be able to be attached to the said two hold-down components on both sides of the wheelchair.

The wheelchair occupant can thus, by increasing the length of both attachment components, attach these to the two hold-down components connected to the vehicle itself, even if the wheelchair does not occupy the optimum position with respect to these two hold-down components. He then brings the wheelchair to the correct position and subsequently reduces the length of the two attachment components to a minimum value.

Preferably, the said hold-down components each comprise a locking buckle and the said attachment components each comprise a flexible tie, adjustable in length, like a strap, fitted with a tongue at one end which can be locked into the said buckle in a similar way to a seat belt.

In order to simplify the adjustment of the two ties of the attachment components, each of these two ties can be connected to the wheelchair by an automatic reel, of the inertia type for example, similar to the reels used for seat belts.

According to a preferred embodiment, the two attachment component ties are connected to the wheelchair by a shared reel of the retractor type, the frame of which is mobile longitudinally in a slideway transverse to the longitudinal direction of the wheelchair. In this case one of the two ties is wound round the reel shaft and the other tie, of fixed length, is attached to this reel's frame. This variant, of simpler and cheaper construction than the one with two reels, nevertheless enables the wheelchair occupant to secure his wheelchair to the vehicle in an extremely simple operation.

The locking buckles can be connected to the walls or floor of the transport vehicle. In the latter case they are advantageously located at the top ends of flexible elastic uprights fastened to the vehicle floor. Each buckle can be supported by a single flexible upright or else by two flexible uprights fastened to the vehicle floor at two points spaced along a straight line parallel to the longitudinal axis of the wheelchair being secured, with the said two uprights coming together at buckle level. These flexible uprights are of such a height that the buckles are within reach of the occupant of the wheelchair.

Referring to the appended drawings we shall now describe in greater detail two embodiments given as non-restrictive illustrations of a safety device according to the invention; in the drawings.

Figure 1:
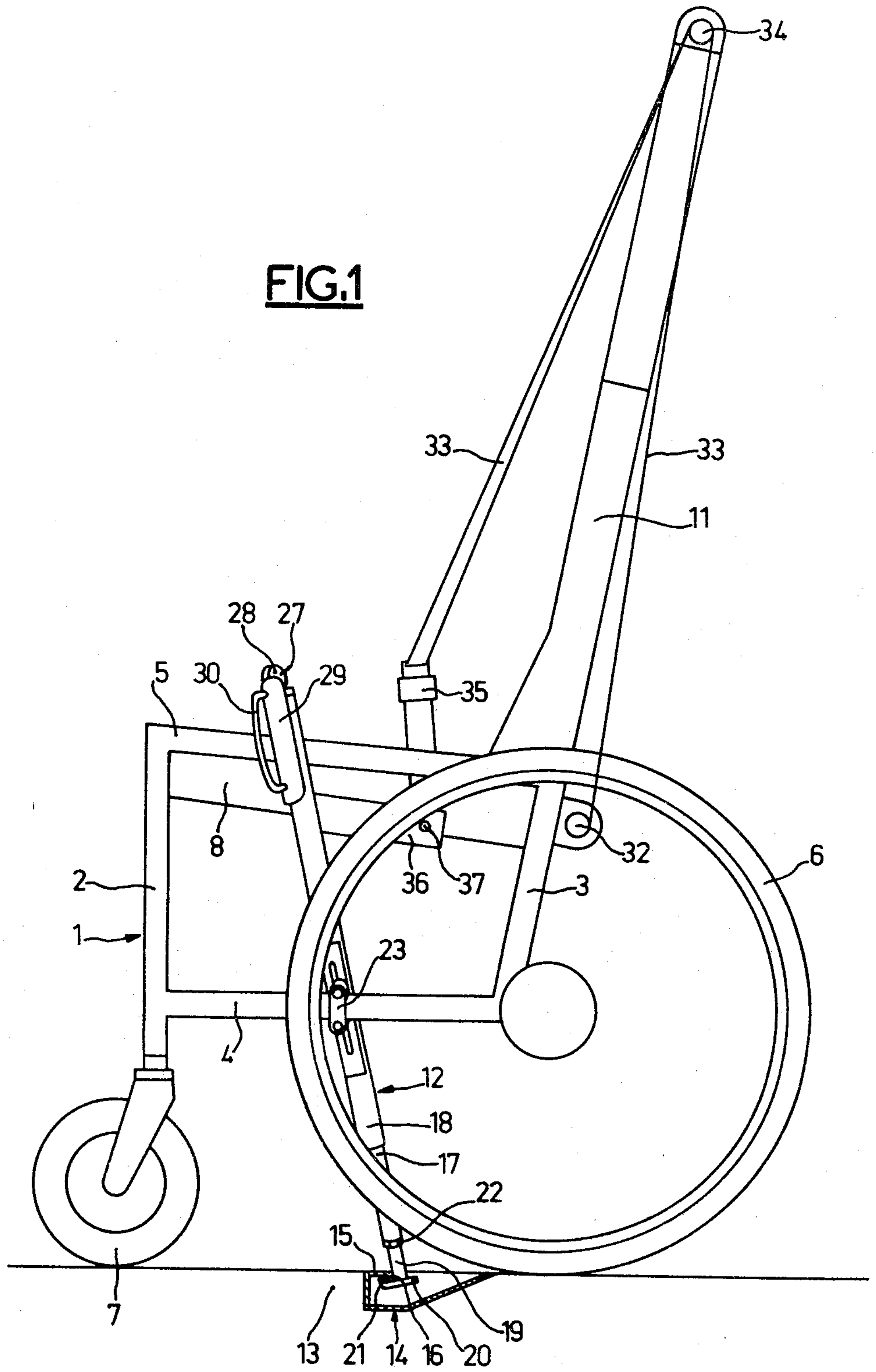
FIG. 1 is a side elevation view of a safety device according to the invention for the vehicular transportation of a person travelling in a wheelchair.
Figure 2:
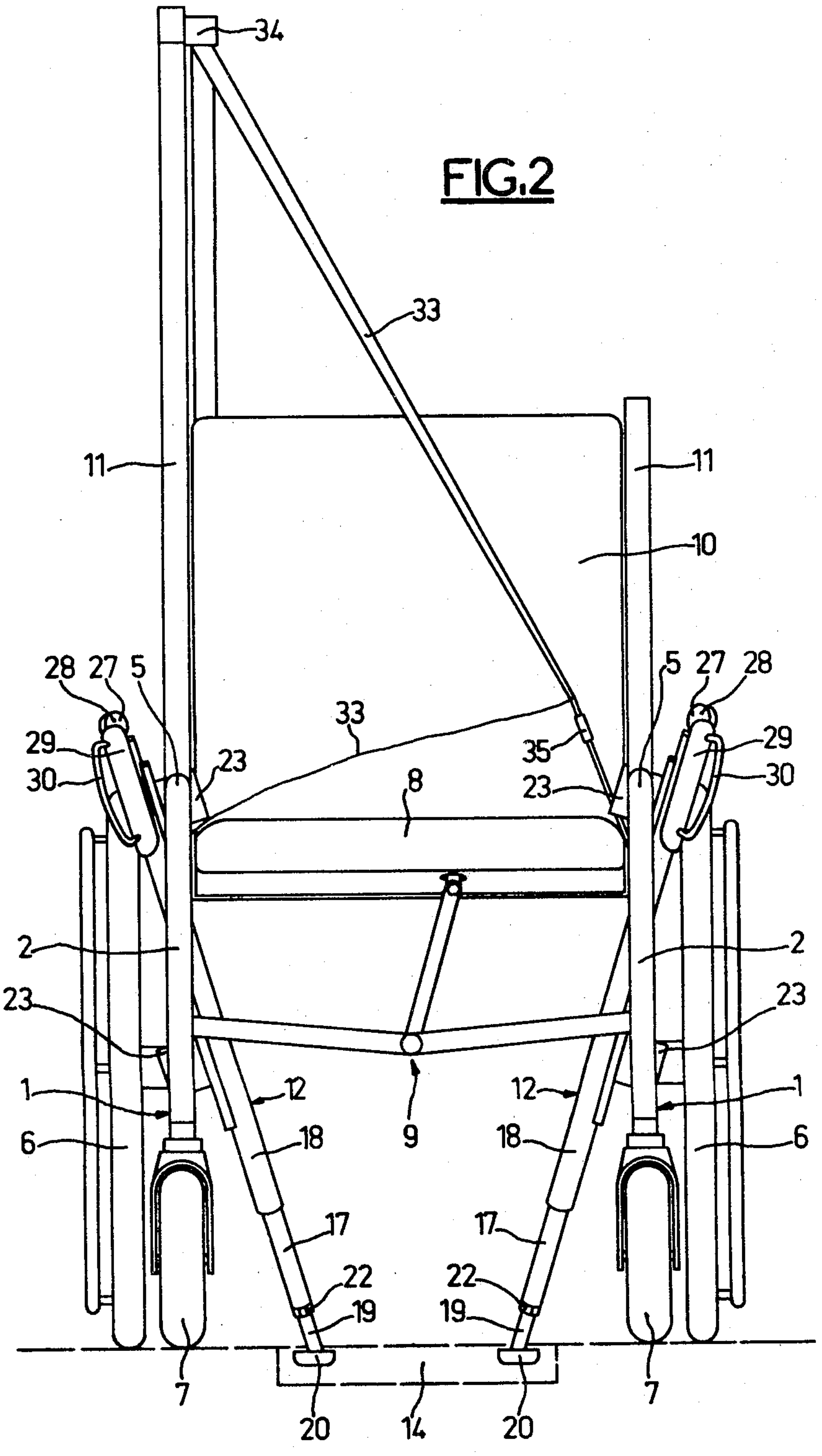
FIG. 2 is a front elevation view of this same device.

FIG. 1 and 2 illustrate a conventional wheelchair comprising a tubular frame formed by two side halves 1. Each half-frame 1 comprises a front upright 2 and a rear upright 3 connected together by a lower long member 4 and an upper long member 5. Each half-frame 1 comprises a large fixed wheel 6 at the rear and a small steerable wheel 7 at the front.

The two half-frames 1 are connected together by a seat 8 and, below this seat, by a system of linkages 9 enabling the frame to be folded.

The back 10 is supported at the rear of the wheelchair by two columns 11, each of which is fixed to one of the half-frames 1.

In order to transport the wheelchair occupant in complete safety in a vehicle (land vehicle, boat, aircraft, etc.) the wheelchair is fitted with a safety belt to hold the occupant in the wheelchair and with a mechanism for securing the wheelchair to the vehicle.

The mechanism for securing the wheelchair to the vehicle comprises a component 12 fastened to each half-frame 1 for attaching the wheelchair to the floor 13 of the transport vehicle. In order to permit the component 12 to be attached to the floor 13 of the vehicle, a hold-down section 14 is set into the floor 13. The hold-down section 14 is shaped like a trough opening upwards placed across the direction of travel of the vehicle. The rear side of the section 14 extends backwards and upwards along a sloping line to the top face of the floor 13. The front side of the section 14 is extended back, on a level with the top face of the floor 13, by a horizontal flange 15 which terminates in a lip 16 pointing downwards. The flange 15 is thus open and accessible both from beneath and from the rear in the direction of travel of the vehicle.

The attachment component 12 comprises a rod 17 fitted to slide inside a tube 18 fixed to the two long members 4, 5 of each half-frame 1. At its bottom end projecting from the tube 18, the rod 17 has a tapped blind hole into which a threaded rod 19 is screwed; this rod 19 carries a grip tab 20 at its bottom end, this tab being designed with a flange 21 which is turned upwards. A nut 22 enables the threaded rod 19 to be locked to the rod 17.

The tube 18 is fixed to the half-frame 1 by means of two clamping collars 23 (see 2, 3, 4) each of which surrounds one of the two half-frame 1 long members 4, 5.

Figure 3:
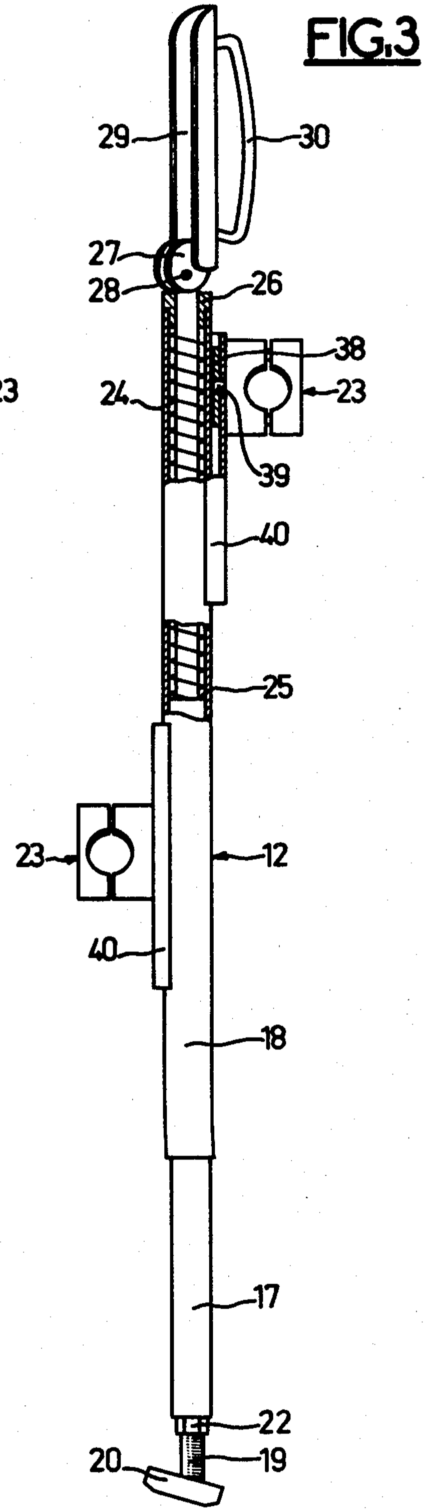
FIG. 3 is an elevation view, in part section, of an attachment component of the mechanism securing the wheelchair to the vehicle of the device in FIG. 1 and 2.

With reference to FIG. 3, the rod 17 is forced down with respect to tube 18 by a compression spring 24 inserted between a shoulder 25 made on rod 17 inside tube 18 and a plug 26 fastened to the top end of tube 18 and having the top end of rod 17 passing through it. An eccentric 27 is hinged by a cross pin 28 to the top end of rod 17, above plug 26, in such a way that the circumferential surface of the eccentric 27 engages like a cam with plug 26. An operating lever 29 is fastened to the eccentric 27 so as to allow the latter to rotate. The lever 29 is fixed to the eccentric 27 in such a way that it lies roughly along the continuation of tube 18 when the pin 28 of the eccentric 27 is in a position closest to the plug 26 and lies flat against tube 18 when the pin 28 of the eccentric 27 is in a position which is furthermost from the plug 26. The lever 29 has a cross-section shaped like an arc of a circle fitting the circular profile of tube 18, so that when it is retracted against tube 18 the lever 29 fits onto part of the cross-section of tube 18. There is a handle 30 fixed to the lever 29 to facilitate the latter's operation.

In the position of the attachment components 12 shown in FIG. 1 and 2, the grip tabs 20 are hooked under the flange 15 of the hold-down section recessed into the floor 13, with the grip tabs 20 being pressed up against the flange 15 of the hold-down section 14 by the action of the eccentrics 27 rotated so that the levers 29 are retracted against the tubes 18. The attachment components 12 thus lock the wheelchair onto the floor 13.

Figure 4:
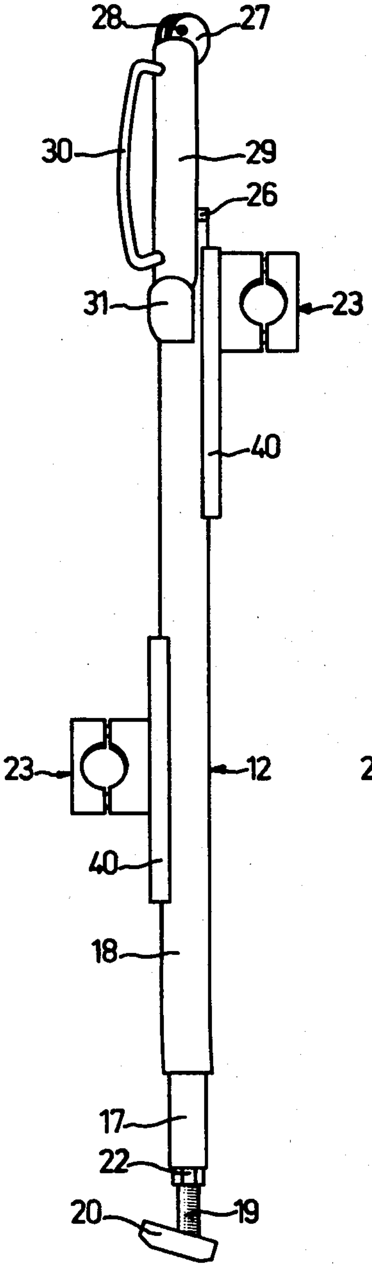
FIG. 4 is an elevation view of this same attachment component in another position.

FIG. 4 shows an attachment component 12 in the out-of-action position, i.e. in the position in which the grip tab 20 is raised above the surface of the floor 13 to enable the wheelchair to move over the floor 13. In this position, the rod 17 is raised with respect to the tube 18 so that the eccentric 27 is some distance above the plug 26 and the rod 17 is fixed in this position with respect to the tube 18, against the action of spring 24, by the lever 29, flattened against the tube 18, the free end of which, facing down, is inserted from the top behind a hook tab 31 which is open upwards and is fixed to the tube 18 near its top end.

The wheelchair is fitted with a three-point seat belt of the inertia reel type. The inertia reel 32 is fixed to the bottom end of one of the columns 11 which is extended up beyond the backrest 10. The belt strap 33 extends from the reel 32 up to a return pulley 34 mounted on the top end of the higher column 11. The other end of the strap 33 and the belt locking buckle 35 are fixed respectively to the attachment components 12 located on either side of the wheelchair. In order to shift these two fixing points backwards a plate 36 (not shown in FIG. 3 and 4) welded to each tube 18 extends back towards the backrest 10 from the tube 18; the said plates 36 have, near their free rear end, the two lower belt anchor points 37, i.e. the anchor points for the strap 33 and for the buckle 35.

The occupant can, without any help, secure himself to the wheelchair by buckling the safety belt, and anchor the wheelchair to the vehicle floor. All the wheelchair occupant has to do is to steer the chair to somewhere near the floor securing position (section 14), with the levers 29 being in the position shown in FIG. 4, i.e. the tabs 20 being raised above the level of the floor 13. He then raises the levers 29 to remove them from the tabs 31 and folds them up so that the rods 17 drop down under the action of the springs 24 until the grip tabs 20 bear against the floor 13. If the grip tabs 20 are already above the hold-down section 14, they enter this directly. Otherwise a slight movement of the wheelchair allows them to be engaged with this section. Then the occupant moves his wheelchair slightly forward so that the grip tabs 20 engage beneath the flange 15 of the section 14, and then he folds the levers 29 down to the position shown in FIG. 1 and 2 so that the eccentrics 27 raise the rods 17, which presses the grip tabs 20 under the flange 15 of the section 14. The wheelchair is thus secured to the floor 13.

In order to detach the wheelchair from the floor 13 the wheelchair occupant folds the levers 29 upwards to the position shown in FIG. 3 so that the eccentrics 27 enable the rods 17 to drop down under the action of the springs 24. The grip tabs 20 thus disengage from the flange 15 of the hold-down section 14. The occupant moves his wheelchair back slightly and then pulls the levers 29 up before folding them back to the position shown in FIG. 4 and locking them to the hook tabs 31. The grip tabs 20 are thus held above the floor 13 and the wheelchair can travel about freely.

It goes without saying that many modifications and variants can be made to the safety device as described above. Thus, the tubes 18 of the attachment components 12 could be anchored to the wheelchair half-frames 1 by other means than the clamping collars 23; for example they could be permanentaly welded. However the clamps 23 have the advantage of providing for a removable fixture for different models of wheelchair, since the clamps 23 can be adjusted along the tubes 18 be means of slides 38 capable of being locked by screws 39 in slideways 40 fixed to the tubes 18.

Furthermore, it is also possible to conceive of other means for operating the attachment components 12 than the eccentrics 27 and the levers 29, for example screw means, although the means shown provide particularly simple and speedy operation.

The spring 24 which pushes the rod 17 down with respect to the tube 18 is not essential, since the weight of the rod 17 is generally sufficient to enable the latter to slide down as soon as it has been released at its top end.

Figure 5:
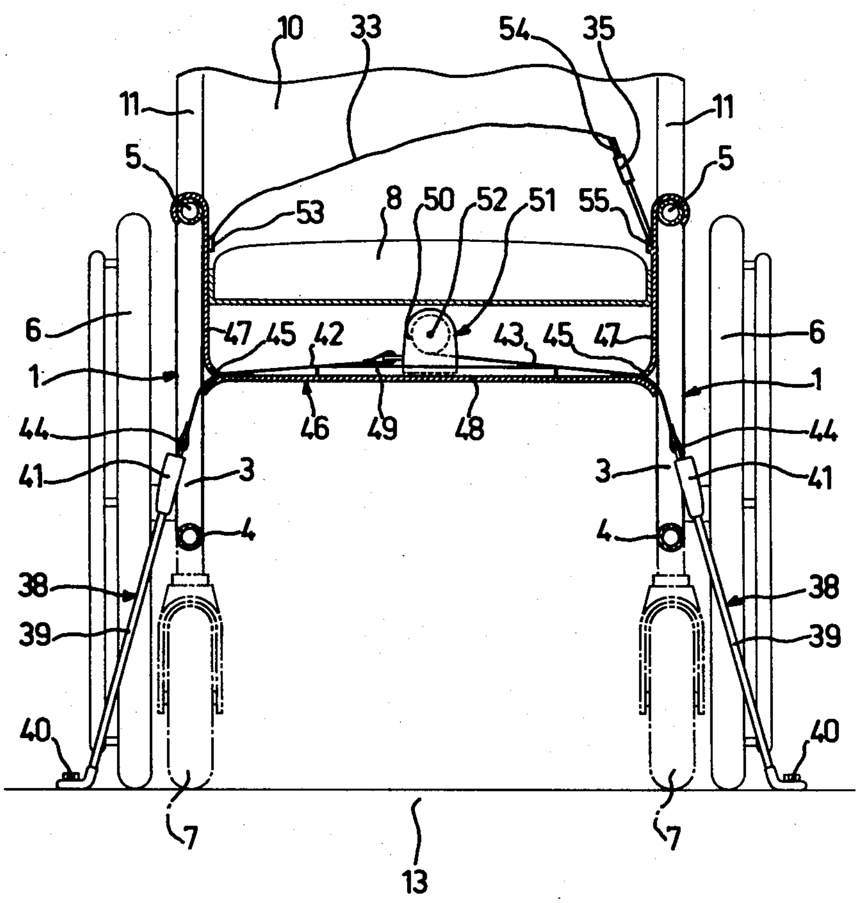
FIG. 5 shows another embodiment of a safety device according to the invention.

In the embodiment illustrated in FIG. 5, the mechanism for securing the wheelchair to the vehicle floor 13 comprises two locking buckle supports 38 each formed by a flexible elastic upright 39 one end of which is fixed, for example by means of a screw 40, to the floor 13 and the other end of which carries the locking buckle. These locking buckle supports are similar to those used on automotive vehicles for locking a safety belt. These two uprights 39 are fastened to the floor 13 at a distance apart which is greater than the track of the wheelchair's front wheels 7. Each upright 39 consists,for example, of at least one metal cable which is flexible and elastic enough to allow the upright to bend when the wheelchair wheels pass through and to subsequently take up its original position, preferably approximately vertical.

Instead of each of them being fixed by a screw 40 to the floor 13, each buckle support 38 can also be fixed into a transverse groove in the floor similar to the hold-down section 14 of the embodiment in FIG. 1 to 4. This provides for very simple adaptation for wheelchairs of different widths.

The wheelchair is fitted with two straps 42 and 43 each carrying at its free end a tongue 44 capable of being locked in one of the locking buckles 41 in a releasable manner. The two straps 42 and 43 pass through two slots 45 made in a U-shaped cradle 46 the two flanges of which are anchored to the two upper long members 5 of the wheelchair frame and the horizontal web 48 of which runs beneath the seat 8. The two slots 45 are made in the cradle 46 near opposite corners between the flanges 47 and the web 48, on the sides of the wheelchair. Each slot 45 is shaped so that the tongue 44 fixed to the free end of strap 42 or 43 respectively cannot pass through the slot 45 and is thus held outside the cradle 46.

The web 48 of the cradle 46, which may preferably be telescopic to enable the cradle to be fitted to different widths of wheelchair, carries or forms a transverse slideway 49 in which the frame 50 of a retractor-type automatic belt reel 51 is mounted. Such reels are already used for seat belts and have the feature of being fitted with a ratchet system which only comes into play after a preset length of belt has been unreeled and after the belt has been subsequently slackened, in order then to resist any further unreeling of the belt whilst nevertheless allowing re-reeling of the belt, under the action of the reel return spring, as soon as the belt is slackened.

The belt end 42 on the opposite side to the tongue 44 is fixed to the casing 50 of the reel 51. The belt end 43 on the same side as the tongue 44 is wound round the shaft 52 of the reel 51.

The wheelchair is also fitted with a safety belt to hold the occupant in the wheelchair. A belt 33 can be seen in FIG. 5, one end of which is fixed at 53 to one of the flanges 47 of the cradle 46 and the other end of which carries a tongue 54 capable of being locked, so as to be releasable, in a buckle 35 anchored at 55 to the other flange 47 of the cradle 46.

In order to secure the wheelchair to the transport vehicle floor, the wheelchair occupant maneuvers the chair so as to bring it into such a position that the two buckle supports 38 are located on either side of the wheelchair between the large wheels 6 and the small wheels 7, which presents no difficulty insofar as the uprights 39 are flexible and move apart. When the wheelchair takes up this position with respect to the buckle supports 38, the wheelchair occupant first pulls outwards (to the left in FIG. 5) on the tongue 44 on strap 42, this tongue 44 being, like tongue 44 of strap 43, pressed, through the action of the reel 51 return spring,- from the outside against the cradle 46 so as to be located in front of the slot 45. The effect of this pull exerted on strap 42, which is fixed in length, is to move the reel 51 (to the left in FIG. 5) in the slideway 49 so that a corresponding length of strap 43 is unwound from the reeling shaft 52 of the reel 51 whose ratchet mechanism has not yet come into action. After locking the tongue 44 of strap 42 into buckle 41 (the left-hand one in FIG. 5), the wheelchair occupant grips the tongue 44 of strap 43 and pulls this tongue outwards (to the right in FIG. 5) so as to unwind from shaft 52 a sufficient length of strap 43 to enable the tongue 44 of this strap to be locked in the buckle 41 (the right-hand one in FIG. 5). When the occupant then releases the tongue 44 of strap 43, locked in buckle 41, the reel 51 tightens strap 43 by winding up the surplus length of this strap. All the seat occupant has then to do is to move his seat back and forth slightly so that, under the action of the pull exerted by the reel 51 on both straps, the seat automatically takes up the optimum position with respect to the two buckle supports 38, i.e. the position in which the length of the two straps 42 and 43 lying outside the cradle is a minimum.

The wheelchair occupant then attaches himself to the chair by buckling the safety belt (33, 35, 54) if he has not already done so.

In order to release the wheelchair from the vehicle floor, the wheelchair occupant simply unlocks the two tongues 44 from the buckles 41, either simultaneously or in succession. In both cases the reel 51 returns the two straps towards the inside of the cradle until the tongues 44 are restrained in front of the slots 45 of the cradle 46. The wheelchair occupant can then manoeuvre his chair freely.

The embodiment according to FIG. 5 can also receive a large number of modifications.

Thus, each buckle 41, instead of being located at the end of a flexible upright 39, could also be placed at the common top end of two flexible uprights, the bottom ends of which are fixed to the vehicle floor 13 at two points spaced along a straight line parallel to the longitudinal axis of the wheelchair being secured.

The single retractor reel for both straps could also be replaced by two fixed reels, of inertia type for example, each acting on one of the two straps. Furthermore, it would also be possible to provide for straps without reels, but the manual adjustment of the strap length would then involve awkward handling operations.

The seat or safety belt for attaching the occupant to his wheelchair can be of the two-point or three-point type, with or without reel, but the use of a three-point reel type provides improved protection, makes it easier to buckle the belt and provides the wheelchair occupant with greater freedom of movement. The flexible elastic uprights 39 can be formed, as has already been mentioned, by metal cables or by cables, straps or ropes in other materials, for example textiles, which can be surrounded by an elastic sheath, for example made of plastics material. The distance apart of the uprights carrying the buckles for securing the wheelchair is preferably greater than the width of the wheelchair frame, but less than the track of the large wheels of the wheelchair. Consequently the uprights position themselves between the large wheels and the frame of the wheelchair and the large wheels do not interfere with the securing mechanism whose reel (or reels) and straps are preferably located in a transverse vertical plane passing roughly through the wheelchair's centre of gravity.

The embodiment in FIG. 1 to 4 is especially suitable for permanent fixing on wheelchairs for people who systematically use the same transport vehicle.

The embodiment in FIG. 5, on the other hand, is more particularly designed for fitting to the wheelchairs of people who do not systematically use the same transport vehicle, since fitting it is an extremely simple and speedy operation, however wide the wheelchairs are.

I claim:

1. A safety device for transporting, in a vehicle, a person who is held in a wheelchair by a safety belt, said vehicle having a floor and being movable in a given direction of travel, said wheelchair having front and rear wheels and a frame which has upper and lower longitudinal bars, said safety device comprising:
   - an elongated holddown section set into the floor of the vehicle, transversely to the direction of travel of the vehicle, said section being in the shape of an upwardly open trough which has a front portion provided with a rearwardly extending flange which is level with the floor, said flange having a downturned lip,
   - two attachments each comprising an outer tube-like member and an inner rod-like member, means for rigidly securing each of said attachments to the upper and lower longitudinal bars of the wheelchair frame in a substantially vertical position at a location between the front and rear wheels of the wheelchair, said inner member being slidable with respect to said outer member and having a lower end projecting downwardly from the outer member, said lower end of the inner member being provided with a grip tab which extends forwardly and has an upwardly turned flange, said inner member having an upper end provided with actuator means operable by the wheelchair occupant for lowering said inner member with respect to said outer member to move said grip tab into said holddown section and for raising said inner member with respect to said outer member and locking it in a raised position where the upwardly turned flange of said grip tab is in hooked engagement with said downturned lip of said holddown section,
   - each said actuator means including an eccentric member which is pivotally connected to the inner member and has a circumferential surface which cammingly engages the upper end of the outer member, an operating lever secured to said eccentric member for operation by the wheelchair occupant, said operating lever being movable from a first position to a second position, said actuator means being operable to lower the grip tab when the lever is moved to said first position and being operable, when the lever is moved to said second position, to raise the grip tab into hooked engagement with the downturned lip of said holddown section.

2. A safety device according to claim 1 wherein the attachments are provided with means for retaining said inner member at a raised position relative to said outer member so that the grip tab is located above the vehicle floor to permit normal movement of the wheelchair on the vehicle floor.

3. A safety device according to claim 1 having a safety belt which is provided with three anchor points, and a wheelchair provided with a backrest with a column having a height which will extend above the shoulders of an occupant of the wheelchair, two of said anchor points of the safety belt being fixed to said outer members of the attachments, and a third said anchor point connected to an upper portion of said column.

* * * * *